United States Patent
Azevedo et al.

(10) Patent No.: US 9,914,405 B2
(45) Date of Patent: Mar. 13, 2018

(54) INNER DECORATIVE TRIM PANEL FOR A SUPPORT

(71) Applicant: PLASTO TECHNOLOGIES, Chenove (FR)

(72) Inventors: Xavier Azevedo, São Paulo (BR); Roland de la Brosse, Dijon (FR)

(73) Assignee: ADHEX TECHNOLOGIES, Chenôve (FR)

( * ) Notice: Subject to any disclaimer, the term of this patent is extended or adjusted under 35 U.S.C. 154(b) by 4 days.

(21) Appl. No.: 15/030,297

(22) PCT Filed: Jul. 3, 2014

(86) PCT No.: PCT/FR2014/051701
§ 371 (c)(1),
(2) Date: Apr. 18, 2016

(87) PCT Pub. No.: WO2015/015078
PCT Pub. Date: Feb. 5, 2015

(65) Prior Publication Data
US 2016/0304035 A1    Oct. 20, 2016

(30) Foreign Application Priority Data
Aug. 1, 2013   (FR) .................................. 1357685

(51) Int. Cl.
*B60R 13/02*   (2006.01)

(52) U.S. Cl.
CPC .. *B60R 13/0243* (2013.01); *B60R 2013/0293* (2013.01)

(58) Field of Classification Search
CPC .. B60R 13/02; B60R 13/0243; B60R 13/0293
(Continued)

(56) References Cited

U.S. PATENT DOCUMENTS

| 4,779,390 A | 10/1988 | Repper et al. |
| 5,133,912 A * | 7/1992 | Hagiwara ............. B29C 44/143 |
| | | 264/275 |

(Continued)

FOREIGN PATENT DOCUMENTS

| DE | 35 22 878 A1 | 1/1987 |
| DE | 101 40 873 A1 | 3/2003 |

(Continued)

OTHER PUBLICATIONS

International Search Report dated Sep. 19, 2014, issued in corresponding International Application No. PCT/FR2014/051701, filed Jul. 3, 2014, 3 pages.

(Continued)

*Primary Examiner* — Gregory Blankenship
(74) *Attorney, Agent, or Firm* — Christensen O'Connor Johnson Kindness PLLC

(57) ABSTRACT

The present disclosure relates to an assembly for a flexible decorative inner panel and a support such as the inner wall of a vehicle door for example. The panel comprises at least one support layer obtained in a foam or similar material and a layer of adhesive on said lower face of the support layer in order to allow bonding of the panel on the support. The support has a groove to receive the peripheral edge of the panel. The panel, at its periphery on its lower face, includes a non-adhesive strip having a width substantially equal to the overhang of the panel relative to the outer wall of the groove. During placement of said panel, the latter is not bonded on the support outside the groove, and after the peripheral edge of the panel becomes embedded in the groove, the adhesive layer bonds to the inner wall of the groove.

12 Claims, 1 Drawing Sheet

(58) Field of Classification Search
USPC .................................... 296/146.7, 39.1, 1.08
See application file for complete search history.

(56) References Cited

U.S. PATENT DOCUMENTS

| | | | | | |
|---|---|---|---|---|---|
| 5,236,534 | A | * | 8/1993 | Noguti | B29C 63/04 156/245 |
| 5,297,842 | A | * | 3/1994 | Hayashi | B29C 51/12 156/260 |
| 5,304,273 | A | * | 4/1994 | Kenrick | B29C 39/10 156/219 |
| 5,326,417 | A | * | 7/1994 | Phelps | B29C 63/025 100/237 |
| 6,004,498 | A | * | 12/1999 | Fujii | B29C 37/0057 264/255 |
| 6,171,428 | B1 | * | 1/2001 | Shon | B60R 13/02 156/212 |
| 7,044,533 | B2 | * | 5/2006 | Dry | B60J 5/0418 296/146.1 |
| 7,332,207 | B2 | * | 2/2008 | Bondar | B29C 44/1257 296/146.7 |
| 7,981,236 | B2 | * | 7/2011 | Muller | B29C 44/141 156/213 |
| 8,056,951 | B2 | * | 11/2011 | Schilles | B60R 7/046 296/146.7 |
| 8,071,002 | B2 | * | 12/2011 | Boyer | B29C 45/14811 264/259 |
| 8,808,830 | B2 | * | 8/2014 | Preisler | B60R 13/011 296/39.1 |
| 8,915,001 | B2 | * | 12/2014 | Breunig | B60Q 3/14 40/546 |
| 9,296,354 | B1 | * | 3/2016 | Preisler | B60R 21/215 |
| 9,314,959 | B2 | * | 4/2016 | Hofmair | B29C 51/10 |
| 2002/0125734 | A1 | * | 9/2002 | Pokorzynski | B29C 44/1257 296/146.7 |
| 2006/0220414 | A1 | * | 10/2006 | Boyer | B60R 13/02 296/146.7 |
| 2007/0059487 | A1 | * | 3/2007 | Dooley | B29C 45/14311 428/137 |
| 2008/0073813 | A1 | * | 3/2008 | Smith | B29C 45/14778 264/266 |
| 2008/0258496 | A1 | * | 10/2008 | Foster | B60R 13/0206 296/146.7 |
| 2010/0171333 | A1 | * | 7/2010 | Smith | B29C 43/18 296/1.08 |
| 2010/0193108 | A1 | * | 8/2010 | Aoyama | B29C 65/5042 156/93 |
| 2011/0291439 | A1 | * | 12/2011 | Iwasaki | B60R 13/0243 296/146.7 |
| 2012/0100342 | A1 | * | 4/2012 | Schaefer | B60N 2/5825 428/156 |
| 2012/0261934 | A1 | * | 10/2012 | Dyckerhoff | B29C 63/04 296/1.08 |
| 2013/0004702 | A1 | * | 1/2013 | Schafer | B29C 44/351 428/102 |
| 2013/0147228 | A1 | * | 6/2013 | Filipp | B60R 13/02 296/70 |
| 2014/0042767 | A1 | * | 2/2014 | Filipp | B32B 7/08 296/70 |
| 2014/0054914 | A1 | * | 2/2014 | Teoh | B29C 45/0053 296/1.08 |
| 2015/0266432 | A1 | * | 9/2015 | Fujita | B60R 13/0256 280/728.3 |
| 2015/0314737 | A1 | * | 11/2015 | Zimmer | B32B 5/02 296/1.08 |
| 2016/0304035 | A1 | * | 10/2016 | Azevedo | B60R 13/0243 |

FOREIGN PATENT DOCUMENTS

| | | |
|---|---|---|
| DE | 10 2004 035 607 A1 | 2/2006 |
| EP | 0 569 846 A2 | 11/1993 |
| JP | 63-312249 A | 12/1988 |
| JP | 2008-31704 A | 2/2008 |

OTHER PUBLICATIONS

Written Opinion of the International Searching Authority dated Sep. 19, 2014, issued in corresponding International Application No. PCT/FR2014/051701, filed Jul. 3, 2014, 5 pages.

* cited by examiner

INNER DECORATIVE TRIM PANEL FOR A SUPPORT

TECHNICAL FIELD

The present invention relates to a flexible inner decorative panel for trimming a support, and more particularly a panel commonly called a medallion for trimming a vehicle door.

PRIOR ART

In the automotive field, flexible inner decorative panels, commonly called medallions, are well known that are secured on a support such as the inner wall of a door, for example to trim it. These flexible inner decorative panels typically consist of a layer of foam, such as polyurethane (PU) foam, including an ornamental fabric, leather or plastic layer, such as a PVC film for example, on its upper face, and a layer of adhesive, such as a pressure-sensitive adhesive, on its lower layer.

These panels are placed manually, for example by gluing said panels on the inner wall of the door and by inserting the peripheral edge of the panel into a groove formed in the inner wall of the door, the peripheral edge of the panel being sealed in the groove using an adhesive, by thermal welding or by mechanical means.

Such decorative inner panels are described in European patent application EP 0,569,846 and German patent application DE 10 2004 035 607 in particular.

Document EP 0,569,846 describes a device for producing trim panels and a method for securing such trim panels on a support. The trim panel includes a cover layer of a finishing material bonded to a support material intended to cover if the inner surface of a vehicle door. The support material is for example a thermoplastic foam and/or a thermoplastic nonwoven that is heated for molding. The cover material of the finishing cover layer is for example fabric that is cooled during pressing, to avoid damaging the cover material. Said panel is manufactured in a molding device such that the contour of the edges of the molding tool forms a rim of the finished panel through the trim panel simultaneously with the molding of the trim panel. The peripheral edge of the panel is formed by shaping the cover material of the finishing cover layer and simultaneously densifying the support material. The peripheral edge of the panel is then fixed in a groove formed in a substrate, for example by an adhesive, by thermal welding, or mechanically.

Document DE 10 2004 035 607 describes a secure fastening system to secure a film on a support surface. Said film consists of a protective film, a decorative film or a film including information for example, and includes a layer of adhesive on the lower face of said film in order to allow the film to be glued on a support. Said support includes a groove in which the peripheral edge of the film is inserted before said groove is embedded by a so-called molding material such as silicone, for example. The molding material can have a convex or concave surface and can extend at the support or at the upper face of the film. This document also describes a method for covering at least part of a surface of a piece of equipment with a film, including a step for shaping the edge of the film and shaping all along a groove milled in a support, a step for adjusting the edge of the film in the groove and a step for filling the groove using a poured material.

These decorative panels of the prior art have the drawback of requiring a finishing step during their placement, such as the placement of a striping at the groove receiving the peripheral edge of the panel, which placement of the latter most costly.

Also known is document DE 35 22 878, which describes a method for preparing decorative cover elements for vehicle doors in particular. The decorative panel is made up of a layer of foam, the upper face of which is provided with an outer material layer glued to said layer of foam. The inner face of the door is covered with a high-frequency activable laminating adhesive, the groove formed in said door also being covered with a layer of high-frequency activable adhesive. The peripheral edge of the decorative inner panel is inserted into the groove of the inner wall of the door by exerting pressure, then a high-frequency field is applied in order to activate the glue and ensure gluing of the layer of foam on the inner wall of the door of the vehicle and in the groove.

This type of decorative panel has the drawback of being costly to implement on the vehicle door. Indeed, it requires a step for depositing a layer of high-frequency activable adhesive on the inner face of the door and in the groove of the latter, and after insertion of the peripheral edge of the decorative inner panel into the groove of the inner wall of the door, a step for applying a high-frequency field to activate the glue while procuring a pressure of the decorative inner panel on the inner wall of the door so as to ensure gluing of said panel.

BRIEF DESCRIPTION OF THE INVENTION

One aim of the invention is therefore to resolve these drawbacks by proposing a decorative panel with a simple design and low cost allowing quick and easy placement on a support without requiring a finishing step.

To that end and according to the invention, proposed is an assembly of a flexible decorative inner panel and a support such as the inner wall of a vehicle door, for example, said panel including at least one layer obtained in a foam or similar material and an adhesive layer on the lower face of the support layer in order to allow the gluing of the panel on the support, and said support including a groove in which the peripheral edge of the panel is embedded; said panel is remarkable in that it includes, at its periphery, on its lower face, a non-adhesive strip having a width substantially equal to the overhang distance of the panel relative to the outer wall of the groove such that, when said panel is placed, the latter does not adhere on the support outside the groove, and such that, after the peripheral edge of the panel is embedded in the groove, the adhesive layer adheres to the inner wall of the groove.

The groove has a width substantially equal to the thickness of the inner panel and a depth substantially equal to the overhang distance of the panel relative to the inner wall of the groove.

Furthermore, the inner edge of the groove is advantageously rounded so as to allow good adhesion of the layer of adhesive on the support at the inner edge of the groove.

Said rounded inner edge of the groove has a curve radius substantially equal to half the width of the groove.

Furthermore, the outer edge of the groove is also rounded and said rounded outer edge of the groove has a curve radius substantially equal to half the width of the groove.

Secondarily, said panel includes a so-called ornamental upper layer secured to the upper face of the foam layer.

Said ornamental layer is obtained from a fabric and/or leather and/or a plastic film.

Another aim of the invention relates to a flexible decorative inner panel for trimming a support such as the inner wall of a vehicle door, for example, said panel including at least one layer obtained in a foam or similar material and an adhesive layer on the lower face of the support layer in order to allow the gluing of the panel on the support, and said support including a groove in which the peripheral edge of the panel is embedded; said panel is remarkable in that it includes, at its periphery, on its lower face, a non-adhesive strip having a width substantially equal to the overhang distance of the panel relative to the outer wall of the groove such that, when said panel is placed, the latter does not adhere on the support outside the groove, and such that, after the peripheral edge of the panel is embedded in the groove, the adhesive layer adheres to the inner wall of the groove.

Said panel includes a so-called ornamental upper layer secured to the upper face of the foam layer.

Furthermore, said ornamental layer is obtained from fabric and/or leather and/or a plastic film.

BRIEF DESCRIPTION OF THE FIGURES

Other advantages and features will better emerge from the following description of a single embodiment, given as a non-limiting example, of the flexible decorative inner panel for trimming a support according to the invention, in reference to the appended drawings, in which.

DETAILED DESCRIPTION OF THE INVENTION

For clarity, in the rest of the description, the same elements have been designated using the same references in the different figures. Furthermore, the various views are not necessarily drawn to scale.

Figure 1:
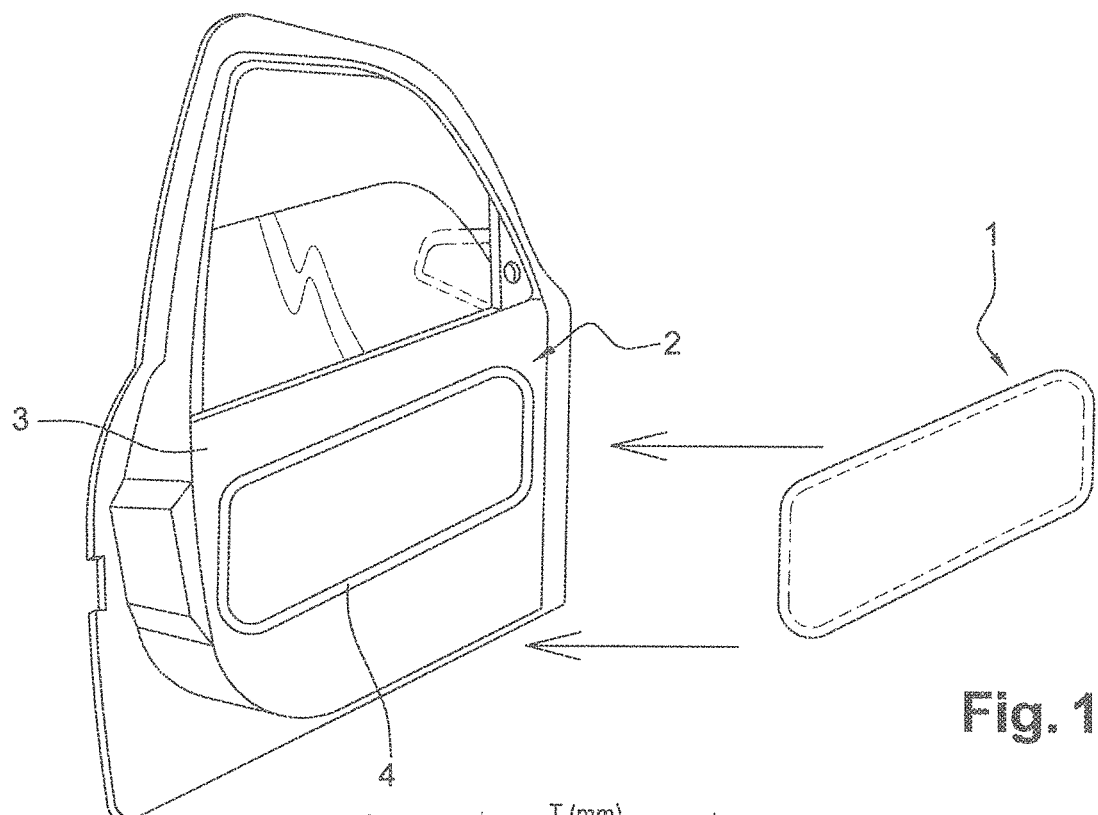
FIG. 1 is a perspective view of a decorative inner panel, called a medallion, of a door for trimming a door of a motor vehicle according to the convention.

In reference to FIG. 1, the flexible decorative inner panel (1) according to the invention is intended to trim a support such as the inner wall of a vehicle door (2) for example, said door (2) including, on its inner wall (3), a groove (4) in which the peripheral edge of the panel (1) is embedded, as will be outlined later.

Figure 2:
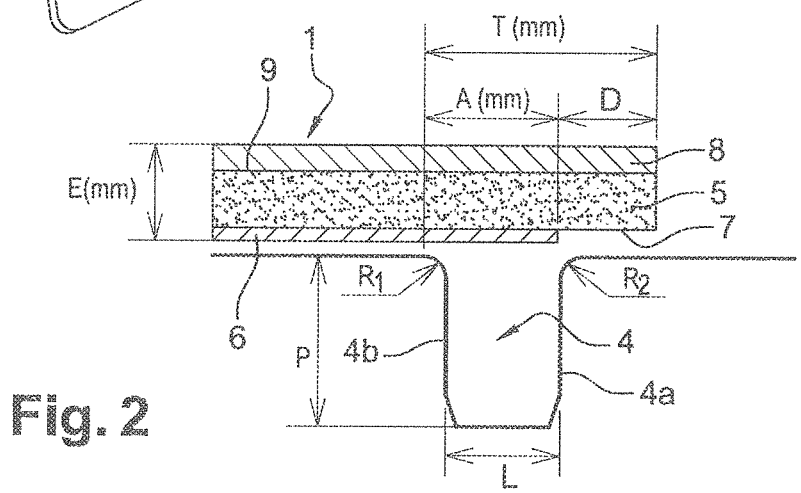
FIG. 2 is a diagrammatic sectional view of the decorative inner panel according to the invention at a support, before its placement, according to the invention.

In reference to FIG. 2, said panel (1) includes a so-called support layer (5) obtained in a foam or similar material and an adhesive layer (6) on the lower face of the support layer (5) in order to allow the gluing of the panel on the support. It will be noted that the support layer (5) may be obtained in any flexible material well known by those skilled in the art, and in particular in polyurethane foam or polyethylene foam for example, and that the adhesive layer may be obtained in an acrylic adhesive with a self-cross-linking solvent base, for example, or any other adhesive well known by those skilled in the art without going beyond the scope of the invention, said adhesive being deposited on the support surface by transfer, for example.

Secondarily, the panel (1) includes a protective film, not shown in the figures, covering the adhesive layer (6) and that is removed before placing the panel (1) on the support (2).

Said panel (1) includes, on its periphery, on its lower face, an adhesive strip (7) having a width D substantially equal to the overhang distance of the panel (1) relative to the outer wall (4a) of the groove (4) such that, during the placement of said panel (1), the latter does not appear on the support (2) outside the groove (4) and, after embedding the peripheral edge of the panel (1) in the groove (4), the adhesive layer (6) adheres to the inner wall (4b) of the groove (4), as will be outlined later.

Said groove (4) has a width L substantially equal to the thickness of each of the inner panel (1) and a depth P substantially equal to the overhang distance of the panel (1) relative to the inner wall (4b) of the groove (4).

Furthermore, the inner edge of the groove (4) is advantageously rounded so as to allow good adhesion of the adhesive layer (6) on the support at the inner edge of the groove (4) and to avoid the appearance of an air bubble on either side of the inner edge of the groove (4) between the support layer (5) and the upper face of the support (2) on the one hand and the inner wall (4b) of the groove (5) on the other hand. Said rounded inner edge of the groove has a curve radius $R_1$ substantially equal to half the width of the groove (4).

Furthermore, the outer edge of the groove (4) is also rounded, and said rounded outer edge of the groove (4) has a curve radius $R_2$ substantially equal to half the width of the groove (4). This rounded outer edge of the groove (4) makes it possible to facilitate the passage of the peripheral edge of the panel (1) during the insertion of the latter into said groove (4) using any appropriate tool, whether manual or robotic.

Secondarily, said panel (1) includes a so-called ornamental upper layer (8) secured to the upper face of the foam support layer (5). Said ornamental layer (8) is obtained in fabric and/or leather and/or a plastic film that is for example glued on the upper face of the support layer using a layer of glue (9).

Figure 3:
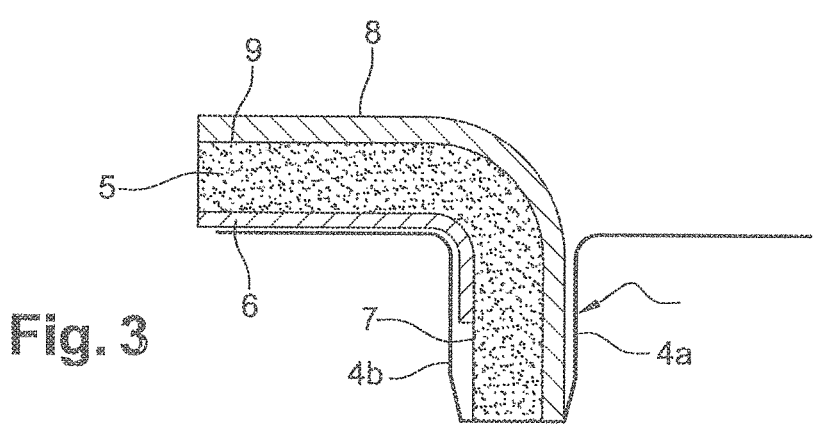
FIG. 3 is a diagrammatic sectional view of the decorative inner panel according to the invention secured to a support, after its placement, according to the invention.

We will now explain the operation of the flexible decorative inner panel for trimming a support according to the invention in reference to FIGS. 2 and 3.

In a first step, the protective film, not shown in the figures, initially covering the adhesive layer (6) is removed, and in reference to FIG. 2, the operator positions the panel (1) such that the non-adhesive strip (7) extends past the outer wall (4a) of the groove (4), i.e., the peripheral edge of the adhesive layer (6) extends at said groove (4).

The operator then exerts pressure on the panel (1) such that the layer of adhesive (6) is glued on the upper face of the support (2) between the inner edges of the groove (4). It will be noted that, in light of the non-adhesive strip (7), the peripheral edge of the panel (1) does not appear on the upper wall of the support (2) outside the groove (4). Next, using an appropriate tool, the operator embeds the peripheral edge of the panel (1) in the groove (4) such that the peripheral edge of the adhesive layer (6) is adhered on the inner wall (4b) of the groove (4). It will be noted that it is not necessary to perform finishing steps such as placing a striping for depositing a sealing material of the groove (4), the latter being completely filled by the bent edge of the panel (1).

Lastly, the examples given above are of course only specific illustrations that are in no case limiting regarding the fields of application of the invention.

The invention claimed is:

1. An assembly, comprising:
   a flexible inner panel; and
   a support of a vehicle door, said support having a groove, wherein said panel comprises:

a support layer having a lower face; and an adhesive layer disposed on the lower face of the support layer, said adhesive layer configured to fasten the panel on the support, wherein said panel has a peripheral edge configured to be embedded in the groove, and wherein said panel includes, at its periphery, and on the lower face of the support layer, a non-adhesive strip having a width substantially equal to an overhang distance of the panel relative to an outer wall of the groove such that, when said panel is placed, the panel does not adhere to the support outside the groove, and that, after the peripheral edge of the panel is embedded in the groove, the adhesive layer adheres to an inner wall of the groove.

2. The assembly according to claim 1, wherein the groove has a width substantially equal to the thickness of the inner panel.

3. The assembly according to claim 1, wherein the groove has a depth substantially equal to the overhang distance of the panel relative to the inner wall of the groove.

4. The assembly according to claim 1, wherein the inner edge of the groove is rounded.

5. The assembly according to claim 4, wherein the rounded inner edge of the groove has a curve radius $R_1$ substantially equal to half the width of the groove.

6. The assembly according to claim 1, wherein the outer edge of the groove is rounded.

7. The assembly according to claim 6, wherein the rounded outer edge of the groove has a curve radius $R_2$ substantially equal to half the width of the groove.

8. The assembly according to claim 1, further comprising an ornamental upper layer secured to the upper face of the support layer.

9. The assembly according to claim 8, wherein the ornamental layer comprises at least one of a fabric, leather, and a plastic film.

10. The assembly according to claim 1, wherein the support layer includes a foam material.

11. A panel for decorating an inner wall of a vehicle, said inner wall including a groove having a depth and a width, the panel comprising:

a support layer having an upper surface and a lower surface;

an adhesive layer disposed on the lower face of the support layer;

a non-adhesive strip disposed at the periphery of the lower surface of the support layer, the non-adhesive strip having a width; and an ornamental layer supported by the upper surface of the support layer, wherein the width of the groove is substantially equal to the thickness of the panel, and wherein the depth of the groove is greater than the width of the non-adhesive strip.

12. A method for installing a panel onto an inner wall of a vehicle door, the inner wall having a contiguous groove, comprising:

obtaining a panel comprised of a support layer having an upper surface and a lower surface, an adhesive layer disposed on a section of the lower surface of the support layer, and a non-adhesive strip disposed outwardly of the adhesive layer and along the periphery of the lower surface, wherein the thickness of the panel is smaller than the width of the groove and the depth of the groove is greater than the width of the non-adhesive strip;

positioning the panel over the inner wall of the vehicle door such that the non-adhesive strip extends past an outer wall of the groove;

pressing the panel onto the inner wall of the vehicle door such that the adhesive layer fastens the panel onto said inner wall; and embedding the peripheral edge of the panel into the groove such that the adhesive layer adheres to the inner wall of the groove.

\* \* \* \* \*